United States Patent [19]

Parkins

[11] Patent Number: 4,833,767

[45] Date of Patent: May 30, 1989

[54] LOCKSMITH'S DOOR SPREADING TOOL

[76] Inventor: Donald L. Parkins, 846 S. 35th Ave., Omaha, Nebr. 68105

[21] Appl. No.: 213,274

[22] Filed: Jun. 29, 1988

[51] Int. Cl.[4] ........................................ B23P 19/04

[52] U.S. Cl. ........................................ 29/239

[58] Field of Search ................. 29/239, 256, 266, 257; 254/100, 231, 204

[56] References Cited

U.S. PATENT DOCUMENTS

| | | | |
|---|---|---|---|
| 1,036,748 | 8/1912 | Tobey | 29/239 |
| 1,365,559 | 1/1921 | Starks | 29/239 |
| 3,461,534 | 8/1969 | Greenspan | 29/239 |
| 3,499,206 | 3/1970 | Quernheim | 29/239 |
| 3,835,522 | 9/1974 | Wand | 29/239 |
| 3,874,639 | 4/1975 | Wilson | 254/100 |
| 4,443,001 | 4/1984 | Haerer | 29/239 |

*Primary Examiner*—Robert C. Watson

[57] ABSTRACT

For controllably spreading or prying the periphery of a locked automobile door away from its jamb, there is provided a locksmith's spreading tool having a primary member adapted to securely hook the door periphery and having a secondary member adapted to stationarily abut the jamb. A manually engageable motivator causes the hooked primary member to move away from the relatively stationary abutting secondry member. The resultant prying away of the door periphery from the jamb enables the locksmith to insert an elongate probing tool into the automobile to unlatch the locked door.

3 Claims, 1 Drawing Sheet

FIG. 2
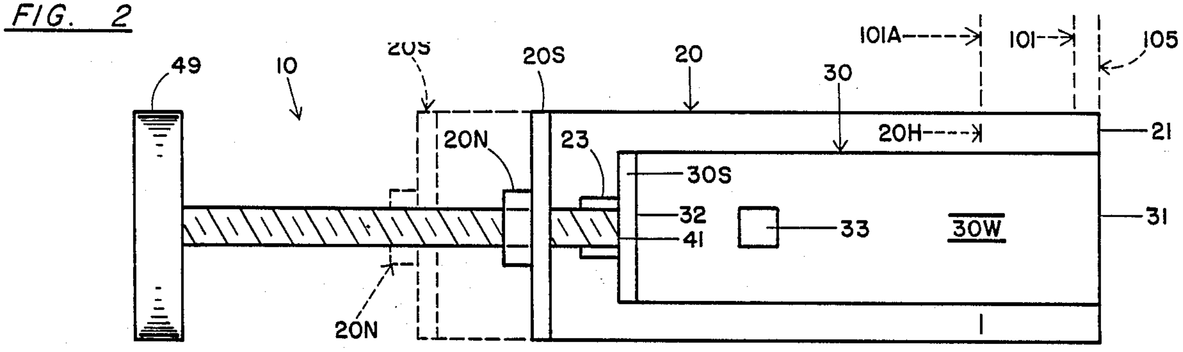
FIG. 3
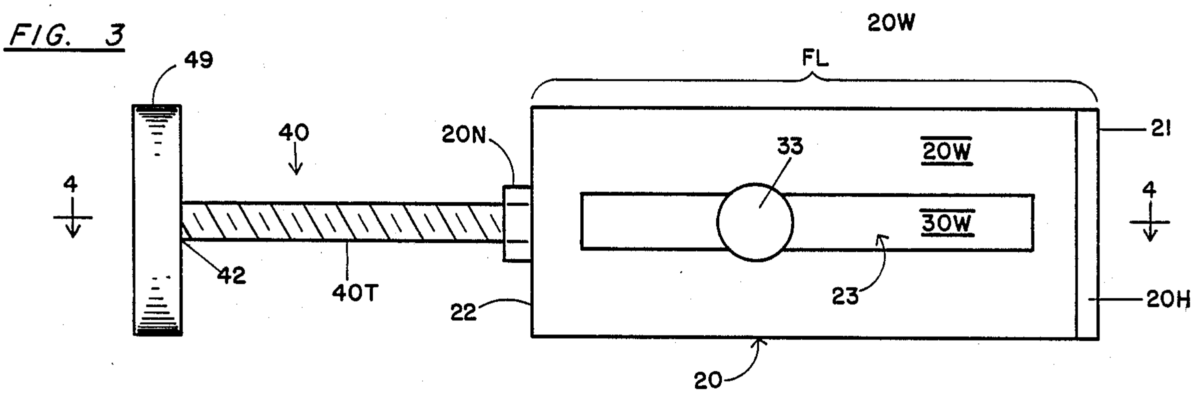
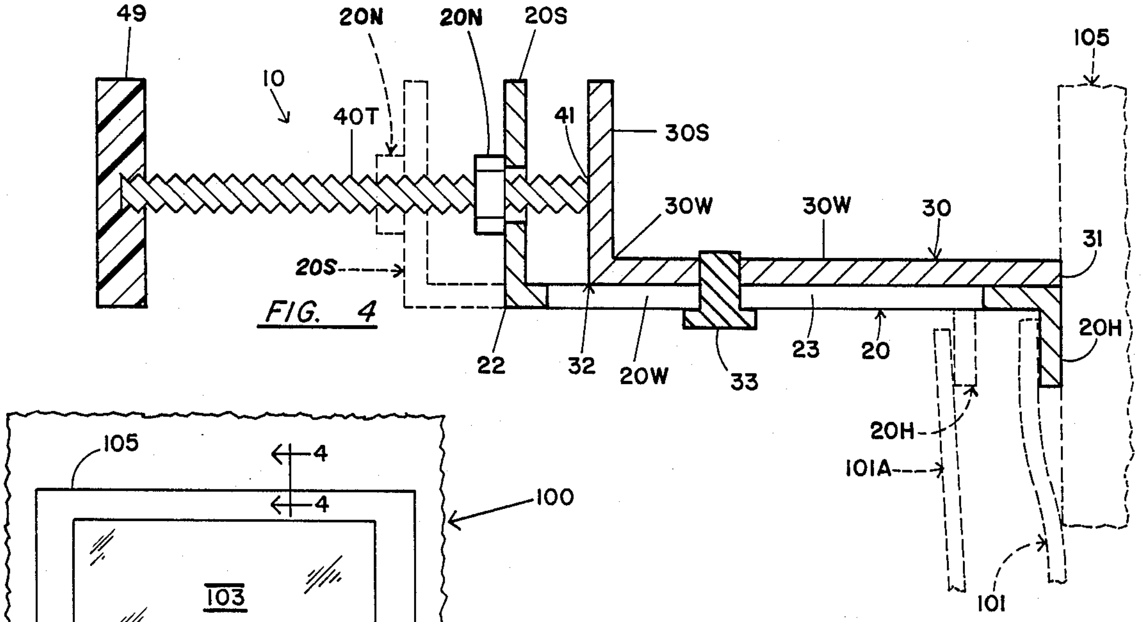
FIG. 4
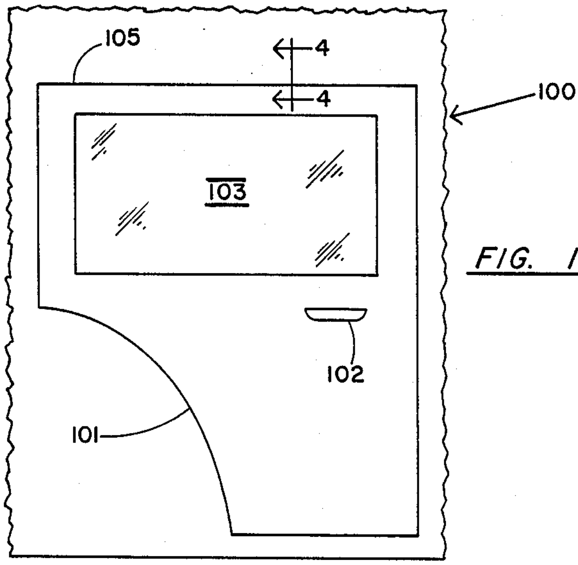
FIG. 1 (PRIOR ART)

LOCKSMITH'S DOOR SPREADING TOOL

BACKGROUND OF THE INVENTION

Drawing FIG. 1 schematically depicts the external side of some conventional automobile or truck 100 having an entry door 101 abutting a jamb or framework 105. Door 101 is conventionally provided with a transparent window 103 and a handle 102 equipped with locking means. Whenever automobile owners find themselves outside the locked door (101) and with the door key inadvertently left inside the automobile (100), a locksmith can be summoned to unlock the door (101) from the external side with an appropriate probing tool e.g. as disclosed in U.S. Pat. No. 4,655,102. Entry of such elongate probing tools can be effected at the periphery of door window 103 e.g. as disclosed in U.S. Pat. No. 4,697,789. However, certain windows are so constructed that they do not permit peripheral entry of an elongate probing tool.

OBJECT OF THE INVENTION

It is accordingly the general objective of the present invention to provide a locksmith's door spreading tool that is adapted to pry sufficient space between the door periphery and jamb and which enables a locksmith to unlock the automobile door with an elongate probing tool inserted at the periphery of the locked door.

GENERAL STATEMENT OF THE INVENTION

With the aforementioned general objective in view, and together with specific and ancillary objectives which will become more apparent as this description proceeds, the locksmith's door spreading tool of the present invention comprises a primary member adapted to securely hook the periphery of an automobile door and also a secondary member adapted to stationarily abut the jamb. The locksmith is provided with a manipulatable motivator that causes the hooked primary member to move away from the jamb abutting secondary member; this relative movement between the primary and secondary members creates a spatial gap between the door periphery and jamb which enables the locksmith to insert an elongate probing tool into the automobile and thereby unlatch the locked door.

BRIEF DESCRIPTION OF THE DRAWING

In the drawing, wherein like characters refer to like parts in the several views, and in which:

FIG. 1 is the aforedescribed schematic view of the external side of an automobile or truck at the doorway thereof and which provides the working environment for the locksmith's door spreading tool of the present invention;

FIG. 2 is a top plan view of a representative embodiment (10) of the locksmith's door spreading tool of the present invention;

FIG. 3 is a bottom plan view of the FIG. 2 representative embodiment; and FIG. 4 is a sectional elevational view taken along line 4—4 of FIG. 3 and employed along line 4—4 of FIG. 1.

DETAILED DESCRIPTION OF THE DRAWING

Locksmith's spreading tool embodiment 10 generally comprises a primary member 20 having a horizontal primary-web 20W slidably engaged (33) with the horizontal secondary-web 30W of secondary member 30. For prying or spreading door 101 away from jamb 105, the primary member 20 is hooked (20H) at the door periphery while the secondary member 30 at lead-end 31 is made to stationarily abut jamb 105, whereupon manual turning of motivator knob 49 causes hooked primary member 20 to pull door 101 away from jamb 105 whereby a probing tool can be inserted by the locksmith between pried door 101A and jamb 105.

Primary member 20 comprises laminar primary-web 20W having upper and lower horizontal planar surfaces that are substantially rectangular in the FIGS. 2 and 3 plan views. Primary-web 20W has a pair of substantially parallel and directionally transversely extenting horizontal ends including a front-end 21 that is directionally longitudinally separated a finite-length "FL" from a rear-end 22. Integrally downwardly from, and preferably coextensively along, said front-end 21 is a hook portion 20H for primary member 20. Integrally upwardly from, and preferably coextensively along, rear-end 22 is a primary-shoulder portion 20S for primary member 20. The aforedescribed components 20W, 20H, and 20S, can be fabricated from a bent, single length of metallic structural material. For purposes to be hereinafter explained: for the majority of its length 21–22, primary-web 20W is provided with a single longitudinally extending slot 23; and primary-shoulder 20S has a rearwardly attached nut 20N having its threaded bore in registry with a relatively enlarged horizontal aperture of primary-shoulder 20S.

Secondary member 30 comprises a laminar secondary-web 30W having planar horizontal upper and lower surfaces that are substantially rectangular in the FIGS. 2 and 3 plan views. The lower surface of secondary-web 30W broadly contacts the upper surface of primary-web 20W. Secondary-web 30W has a pair of substantially parallel and directionally transversely extending horizontal ends including a lead-end 31 that is directionally longitudinally spaced less than said distance "FL" from a trail-end 32. In the "ready" condition for the locksmith's tool, jamb abuttable lead-end 31 directly overlies door hooking portion 20H. Integrally upwardly from, and preferably coextensively along, trail-end 32 is secondary-shoulder portion 30S that is permanently forwardly of primary-shoulder portion 20S. The aforedescribed components 30W and 30S can be fabricated from a bent, single length of metallic material.

There are slidable engagement means for establishing and maintaining a directionally longitudinal slideable relationship between the primary member (e.g. at 20H) and the secondary member (e.g. at 31). Herein such slideable engagement means comprises a button 33 having a rectangular upper portion attached to the secondary-web 30W, said button extending through primary-web slotted portion 23; button 33 has an enlarged circular lower portion at the primary-web lower surface.

There is a motivator member (e.g. 40) for selecting the directionally longitudinal inter-relationship between the primary member (e.g. at 20H) and the secondary member (e.g. at 31). In other words, the motivator member motivates the tool 10 from its solid lines "ready" condition to its phantom line "activated" condition. Herein, motivator means 40 comprises a substantially horizontal and directionally longitudinally extending threaded stud 40T having a fore-end 41 impinging upon the rearward side of stationary secondary member 30 (i.e. at secondary-shoulder 30S). Between fore-end 41 and aft-end 42, threaded stud 40T passes through the primary-shoulder enlarged aperture and is threadedly engaged at said primary-shoulder such as, for example, with attached nut 20N. Located remotely rearwardly of primary-shoulder 20S is a manually engageable handle means for turning threaded stud 40T about its axis; herein, such handle means comprises a knob 49 that is affirmatively attached to stud aft-end 42.

Although already having been alluded to, operation of the locksmith's spreading tool representative embodiment 10 might be summarized as follows. At the first operational step and with the tool at "ready" condition, the hooked portion 20H is pressed into the juncture of door 101 and jamb 105 whereby hook 20H therein affirmatively engages door 101 and the secondary member lead-end 31 abuts jamb 105. Ancillary to effecting this first operational step, a screwdriver or similar wedge might be briefly employed. Next, the operator manually grasps and turns the motivator handle (e.g. knob 49) whereby the primary member 20 moves along the relatively stationary stud 40 and tool 10 assumes the "actuated" condition indicated in FIGS. 2 and 4 phantom lines and whereat the automobile door is at a spread condition 101A. At such "actuated" or door-spread condition, it has become possible for the locksmith to insert an elongate probing tool between jamb 105 and spread door 101A to unlatch the door.

From the foregoing, the construction and operation of the locksmith's spreading tool for prying an opening between an automobile door and its jamb will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. Locksmith's tool for spreading an automobile door away from the jamb, said spreading tool comprising:

(A) a door engaging primary member including:

(Ai) a substantially horizontal laminar primary-web portion having a directionally transversely extending front-end that is directionally longitudinally separated from a directionally transversely extending rear-end, said primary-web portion and for the majority of said longitudinal distance between front-end and rearend being provided with a single longitudinally extending slot, (Aii) a hook portion extending substantially vertically downwardly from and transversely coextensively along said primary-web front-end, and (Aiii) a primary-shoulder portion extending substantially vertically upwardly from and transversely coextensively along said primary-web rear-end;

(B) a jamb abutting secondary member including:

(Bi) a substantially horizontal laminar secondary-web portion resting upon and broadly contacting said primary-web portion, said secondary-web having a transversely extending lead-end that is adapted to abut said jamb and that is directionally longitudinally forwardly separated from a directionally transversely extending trail-end that is located forwardly of said primary-shoulder portion, (Bii) a button attached to a rearward portion of said secondary-web and extending downwardly therefrom and through said single and directionally longitudinal slotted portion of said primary-web, and (Bii) at said secondary-web trail-end and transversely coextensively therealong, an upwardly extending secondary-shoulder that is located forwardly of said primary-shoulder; and (C) a manually actuatable motivator member including:

(Ci) a substantially horizontal and longitudinally extending stud threadedly engaged with said primary member adjacent said primary-shoulder, said stud having a fore-end adapted to impinge against said secondary-shoulder and having an aft-end located remotely rearwardly of said primary-shoulder, and (Cii) located remotely rearwardly of said primary-shoulder, a manually graspable handle means for turning said threadedly engaged stud and thereby determine the longitudinal interrelationship between the primary member hook portion and the secondary member lead-end.

2. The locksmith's spreading tool of claim 1 wherein the primary-shoulder is centrally apertured to loosely surround a threaded stud and wherein a threaded nut is attached to the rearward side of said primary-shoulder and in registry with said central aperture whereby said attached nut provided threaded engagement for said threaded stud at said primary-shoulder.

3. The locksmith's spreading tool of claim 2 wherein the motivator member handle means comprises a manually engageable knob attached to the threaded stud aft-end.

* * * * *